(12) United States Patent
Bakita et al.

(10) Patent No.: US 7,734,770 B2
(45) Date of Patent: *Jun. 8, 2010

(54) SYSTEM AND METHOD FOR MONITORING INFORMATION IN A NETWORK ENVIRONMENT

(75) Inventors: Thomas R Bakita, Raleigh, NC (US); Chris O'Rourke, Apex, NC (US); Dwight R Frye, Cary, NC (US); Frank W Pittenger, Raleigh, NC (US); John G White, Cary, NC (US); Keith R Schomburg, Apex, NC (US); Robert A Mackie, Cary, NC (US); Walter G Dixon, Fuquay-Varina, NC (US)

(73) Assignee: Cisco Technology, Inc., San Jose, CA (US)

( * ) Notice: Subject to any disclaimer, the term of this patent is extended or adjusted under 35 U.S.C. 154(b) by 995 days.

This patent is subject to a terminal disclaimer.

(21) Appl. No.: 11/428,412

(22) Filed: Jul. 3, 2006

(65) Prior Publication Data
US 2006/0252410 A1 Nov. 9, 2006

Related U.S. Application Data

(63) Continuation of application No. 10/119,881, filed on Apr. 9, 2002, now Pat. No. 7,103,659.

(51) Int. Cl.
*G06F 15/173* (2006.01)
(52) U.S. Cl. .............. 709/224; 709/223; 709/225; 709/226; 709/229
(58) Field of Classification Search ......... 709/223–226, 709/229; 705/30, 34, 40
See application file for complete search history.

(56) References Cited

U.S. PATENT DOCUMENTS

| 5,794,221 | A | 8/1998 | Egendorf | 705/40 |
|---|---|---|---|---|
| 5,815,665 | A | 9/1998 | Teper et al. | 709/229 |
| 5,905,736 | A | 5/1999 | Ronen et al. | 370/546 |
| 5,956,391 | A | 9/1999 | Melen et al. | 379/114 |
| 5,970,477 | A | 10/1999 | Roden | 705/32 |
| 6,047,051 | A | 4/2000 | Ginzboorg et al. | 379/130 |

(Continued)

FOREIGN PATENT DOCUMENTS

EP 1 039 688 A2 9/2000

(Continued)

OTHER PUBLICATIONS

Canadian Intellectual Property Office letter to Gowling LaFleur Henderson LLP regarding Office Action for Canadian Patent Application No. 2,480,496 dated Nov. 24, 2008, forwarded by foreign associate to Baker Botts on Mar. 2, 2009, 3 pages.

(Continued)

*Primary Examiner*—Faruk Hamza
(74) *Attorney, Agent, or Firm*—Baker Botts L.L.P.

(57) ABSTRACT

A method for monitoring information in a network environment is provided that includes receiving one or more packets from a communication flow initiated by an end user. The information associated with the communication flow is then selectively communicated to a plurality of client-aware network elements.

20 Claims, 2 Drawing Sheets

U.S. PATENT DOCUMENTS

| | | | |
|---|---|---|---|
| 6,230,012 B1 | 5/2001 | Wilkie et al. | 455/435 |
| 6,263,369 B1 | 7/2001 | Sitaraman et al. | 709/225 |
| 6,286,030 B1 | 9/2001 | Wenig et al. | 709/203 |
| 6,298,383 B1 | 10/2001 | Gutman et al. | 709/229 |
| 6,377,955 B1 | 4/2002 | Hartmann et al. | 707/104.1 |
| 6,427,170 B1 | 7/2002 | Sitaraman et al. | 709/226 |
| 6,463,468 B1 | 10/2002 | Buch et al. | 709/219 |
| 6,609,154 B1 | 8/2003 | Fuh et al. | 709/225 |
| 6,615,262 B2 | 9/2003 | Schweitzer et al. | 709/224 |
| 6,636,894 B1 | 10/2003 | Short et al. | 709/225 |
| 6,714,987 B1 | 3/2004 | Amin et al. | 709/249 |
| 6,741,853 B1 | 5/2004 | Jiang et al. | 455/418 |
| 6,789,110 B1 | 9/2004 | Short et al. | 709/221 |
| 6,819,652 B1 | 11/2004 | Akhtar et al. | 370/230 |
| 6,834,300 B1 | 12/2004 | Barna et al. | 709/223 |
| 6,847,613 B2 | 1/2005 | Mimura et al. | 370/235 |
| 6,917,617 B2 * | 7/2005 | Jin et al. | 370/395.21 |
| 6,925,297 B2 | 8/2005 | Wenzel | 455/411 |
| 6,976,070 B1 | 12/2005 | Hoashi et al. | 709/224 |
| 7,020,090 B2 | 3/2006 | Chandwadkar et al. | 370/249 |
| 7,269,727 B1 * | 9/2007 | Mukherjee et al. | 713/160 |
| 7,296,078 B2 * | 11/2007 | Sanchez Herrero et al. | 709/229 |
| 7,469,294 B1 * | 12/2008 | Luo et al. | 709/229 |
| 7,530,095 B2 * | 5/2009 | Lee et al. | 726/4 |
| 2002/0046277 A1 * | 4/2002 | Barna et al. | 709/224 |
| 2002/0059114 A1 | 5/2002 | Cockrill et al. | 705/27 |
| 2003/0079021 A1 * | 4/2003 | Fan | 709/227 |

FOREIGN PATENT DOCUMENTS

| | | |
|---|---|---|
| WO | WO 98/26381 | 6/1998 |
| WO | WO 99/31610 | 6/1999 |
| WO | WO 01/31886 A2 | 3/2001 |
| WO | WO 01/58110 A2 | 8/2001 |
| WO | WO 02/11468 A2 | 2/2002 |

OTHER PUBLICATIONS

The Second Office Action from the Patent Office of the People's Republic of China, Application No. 03807778.7, Associate's reporting correspondence to Baker Botts dated Nov. 18, 2009, 4 pages.

* cited by examiner

SYSTEM AND METHOD FOR MONITORING INFORMATION IN A NETWORK ENVIRONMENT

CROSS-REFERENCE TO RELATED APPLICATION

This application is a continuation of U.S. application Ser. No. 10/119,881, filed Apr. 9, 2002 and entitled "System and Method for Monitoring Information in a Network Environment."

TECHNICAL FIELD OF THE INVENTION

This invention relates in general to the field of network communications and more particularly to a system and method for monitoring information in a network environment.

BACKGROUND OF THE INVENTION

Effective network communications is becoming increasingly important in today's society. One aspect of network communications relates to the ability to gather or to monitor information that is contained within a communication flow. Devices, components, and equipment within a network may wish to glean information from the communication flow in order to provide some capability or enhancement to entities within a network or to accommodate or account for an end user in some fashion.

In monitoring or gleaning information from a communication flow, a piece of network equipment needs to be bluntly inserted into a communications line such that the communication flow passes through the inserted piece of network equipment. This network configuration suffers from a number of drawbacks. For example, pieces of network equipment that are inserted into the line slow overall network communications because the communication flow needs to be received and then retransmitted at each piece of equipment in the communication flow. In addition, some of the inserted network devices may wish to process the information within the communication flow before communicating the data to a next destination which also slows network communications. The processing of the information may affect the communications format presenting compatibility or encryption/decryption problems for devices and equipment positioned downstream of the processing equipment. Moreover, the inserted piece of network equipment may only need a small amount of information from the communication flow.

Yet another problem associated with this configuration relates to the issue of priority. Essentially, each owner or lessor of the inserted device, component, or equipment would generally desire to be positioned first in priority for receiving the communication flow. Accordingly, a hierarchy must be established and maintained, presenting additional constraints and management problems for the network. Yet another drawback to this system is that this network configuration is inhibited by failover characteristics because a malfunction or a breakdown in one device or component may result in a truncation of the communication flow such that devices downstream are unable to receive data from the communication flow.

SUMMARY OF THE INVENTION

From the foregoing, it may be appreciated by those skilled in the art that a need has arisen for an improved network communications approach that provides the capability for multiple devices or components to receive information relating to communication flows. In accordance with one embodiment of the present invention, a system and method for monitoring information in a network environment are provided that substantially eliminate or greatly reduce disadvantages and problems associated with conventional information monitoring or proxying techniques.

According to one embodiment of the present invention, there is provided a system for monitoring information in a network environment that includes receiving one or more packets from a communication flow initiated by an end user. The information associated with the communication flow is then selectively communicated to a plurality of client-aware network elements.

Certain embodiments of the present invention may provide a number of technical advantages. For example, according to one embodiment of the present invention, a network communications approach is provided that allows multiple devices or components within a network environment to receive information relating to a communication flow without burdening the overall network system. Effective communications may be realized because a single element is inserted in the communication flow instead of a series of intrusive devices that slow network communications. The single access element operates to share information among all interested devices and performs the sniffing or detecting function at a single location. The access element also avoids latency issues caused by network equipment that prolongs the delivery of a communication flow because of either processing requirements or the receiving and retransmitting of data.

Another advantage provided by one embodiment of the present invention relates to easier manageability for network architectures. This is achieved by having a single access element in the communication flow. Therefore, changes or modifications to the network in the communication flow implicate only that element instead of a series of devices or components in the communication flow. The integration of new components in the network is also made easier because only the access element is affected by the change in network configuration. Also, formatting, encryption/decryption, and compatibility issues with new equipment being introduced in the communication flow will only involve the access element instead of all of the equipment in the stream of the communication flow.

Yet another advantage provided by one embodiment of the present invention relates to the failover capabilities within the network. The non-operation of a single component seeking information relating to the communication flow will not affect the overall operation of the network. This is true because the access element is the only piece of network equipment that impacts the communication flow. Embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF THE INVENTION

Figure 1:
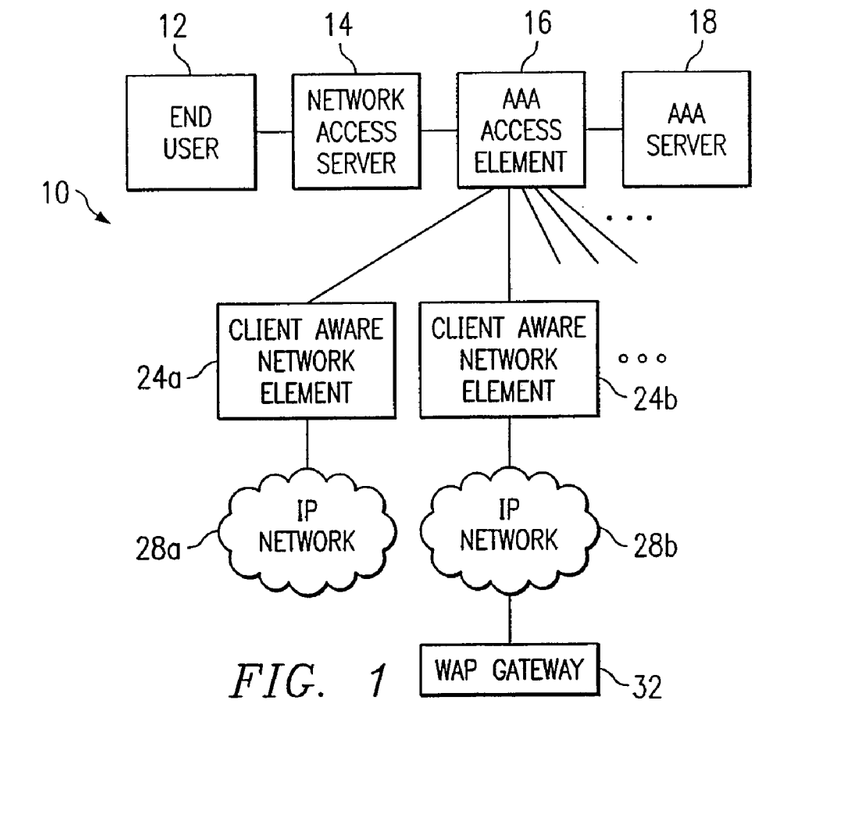
FIG. 1 is a simplified block diagram of a communication system for monitoring data in a network environment.

FIG. 1 is a simplified block diagram of a communication system 10 for monitoring data in a network environment in accordance with one embodiment of the present invention. Communication system 10 includes an end user 12, a network access server (NAS) 14, an authentication, authorization, and accounting (AAA) access element 16 and an AAA server 18. Communication system 10 also includes multiple client-aware network elements 24a and 24b, multiple internet protocol (IP) networks 28a and 28b, and a wireless application protocol (WAP) gateway 32.

According to the teachings of one embodiment of the present invention, AAA access element 16 operates to replace, to supplement, or to imitate or mimic one or more devices (or capabilities thereof) that are positioned in a communication flow initiated by end user 12. AAA access element 16 gleans information from the communication flow and may then selectively disseminate data associated with the communication flow to client-aware network elements 24a and 24b. The information gleaned by access element 16 and subsequently communicated to or shared with other elements in communication system 10 may be any suitable data such as: the location of end user 12, protocols or technologies being used in the communication flow, historical information, bandwidth parameters, communication service data, or other network characterization information or user parameters, for example.

The use of AAA access element 16 allows multiple devices or components within communication system 10 to receive information relating to a communication flow without burdening the overall system architecture by being inserted directly into the communications pathway. The use of AAA access element 16 avoids the necessity for each client-aware network element 24a and 24b to have its own proxying device in the communication flow between end user 12 and AAA server 18 in order to gain access to the communication flow and detect relevant information associated therewith.

AAA access element 16 provides for efficient communications because only AAA access element 16 is inserted in the communication flow, instead of a series of intrusive devices that operate to slow network communications. AAA access element 16 may share information among interested client-aware network elements 24a and 24b and may further perform the sniffing or detecting functions at a single location. The use of a single proxying point provided by AAA access element 16 effectively avoids latency issues caused by network equipment that operate to prolong the delivery of a communication flow due to processing requirements or because of the receiving and retransmitting of data. AAA access element 16 also significantly reduces complexity in network architecture as only one device provides a system constraint with respect to failover, redundancy, and integration considerations.

End user 12 is a person or an entity that initiates a communication in a network environment. Alternatively, end user 12 may be any network element, such as a computer, a database, a program, or any other suitable element seeking to initiate (or cause the initiation of) or to participate in a communication in communication system 10. End user 12 may establish a communication flow directed toward AAA server 18 or to any other element within communication system 10. The communication flow may contain data packets or cells in any suitable communications protocol or format for propagation through communication system 10. Data, as used herein in this document, refers to any type of numeric, voice, or script data, or any other suitable information in any appropriate format that may be communicated from one point to another.

End user 12 may include a cellular (or wireless) telephone, a personal digital assistant (PDA), a laptop or electronic notebook, or any other device, component, or object capable of initiating voice or data exchanges within communication system 10. End user 12 may also be accompanied by an interface, such as a microphone, a display, or a keyboard or other terminal equipment (such as for example an interface to a personal computer or to a facsimile machine in cases where end user 12 is used as a modem).

In operation of a particular embodiment of the present invention, end user 12 initiates (or causes to be initiated by NAS 14) or participates in a communication flow within a network using a radius communication protocol. Any suitable communications protocol may be used by end user 12 in order to facilitate a communications session or a communication flow between any two pieces of network equipment. For example, diameter, or a terminal access controller access system (TACACS) protocol may be used in communication system 10. TACACS represents an industry standard protocol specification, RFC 1492, that forwards username and password information to a centralized server. The centralized server can either be a TACACS database or a database like the UNIX password file with TACACS protocol support. For example, the UNIX server with TACACS passes requests to the UNIX database and sends the accept or reject message back to the access server.

The radius communication protocol may send a number of elements within the communication flow, such as a NAS IP address (indicating which NAS granted access to end user 12 onto the network), a framed IP address (potentially indicating the identity of end user 12), a NAS identifier, a mobile station identifier (the entity that generated or otherwise placed the original communication), a calling station identifier (the number that was dialed), or other vendor-specific information. In a particular embodiment of the present invention, this information is specific to a layer two session of end user 12.

NAS 14 is an element that provides access to a network for end user 12. NAS 14 may be used with a transmission control protocol/internet protocol (TCP/IP) network, including serial terminal access controllers, modem pools or stacks, integrated services digital network (ISDN) routers, and multi-function access controllers. NAS 14 may also be used in combination with any element that provides switched service connections, point-to-point (PPP) serial IP protocols, and user authentication functions. NAS 14 may support serial line internet protocol (SLIP) and/or PPP protocols, allowing NAS 14 to establish and to manage the individual communications links to the remote sites across a switched service. NAS 14 may authenticate end user 12 before allowing access to a network or to another server. NAS 14 may also store one or more identification elements or passwords that may be used in authenticating end user 12.

NAS 14 may use TACACS, radius, diameter, or any other suitable communications protocol in order to provide an authentication functionality. In a particular embodiment, the communication protocol implemented by NAS 14 is radius. NAS 14 may use a network access identifier (NAI), such as the user ID submitted by end user 12 for example, during PPP authentication. The NAI may be used to identify end user 12 as well as to assist in the routing of an authentication request.

In operation, NAS 14 operates to bring up a layer two communication session with end user 12. NAS 14 may also provide AAA functions on behalf of end user 12 and perform IP address management for end user 12.

AAA access element 16 is a component that monitors, sniffs, gleans, or otherwise detects information from a communication flow and makes that information available to other equipment in communication system 10. Although described in the context of AAA applications, AAA access element 16 need not be based on AAA topologies, configurations, protocols, or architectures. AAA access element 16 may be any element that gains access to a communication flow between two points. The AAA application has been offered only for purposes of teaching. AAA access element 16 represents a single authoritative snooping element that may be positioned in place of (or in conjunction with) several devices performing similar functions. AAA access element 16 reduces architecture complexity, provides for easier integration of network equipment, and allows communication system 10 to be managed more easily. Proxying is solved once by AAA access element 16, in one location, instead of several devices being implicated. AAA access element 16 may also perform any necessary encrypting or decrypting protocols, or other suitable transformations where appropriate, as a request packet propagates through communication system 10. This may be particularly beneficial in the radius communication protocol where encryption/decryption is generally needed and operates to slow communications propagating through a network.

AAA access element 16 may replicate traffic between AAA server 18 and end user 12 for pre-existing client-aware network elements 24a and 24b that are designed to be passive proxies in the communication flow. In a particular embodiment, client-aware network elements 24a and 24b may be configured to treat AAA access element 16 as both client and server. AAA access element 16 may also offer an extensible mark-up language (XML) interface or a common object request broker architecture (CORBA) interface to any one of the network elements within communication system 10.

In operation for pre-existing client-aware network elements 24a and 24b, AAA access element 16 proxies traffic from the communication flow initiated by end user 12. Having read or otherwise received the communication flow, AAA access element 16 may then replicate these message flows through one or more client-aware network elements 24a and 24b independently. In seeing AAA access element 16 as both client and server, client-aware network elements 24a and 24b are duped into thinking that they are installed in the main flow of radius communications.

Because AAA access element 16 is configured to reflect the true reply of AAA server 18 back to a network element, some state information may be maintained about the status of the communication flow between end user 12, AAA server 18, and client-aware network elements 24a and 24b. For example, when a request is replicated to client-aware network elements 24a and 24b, it will be provided back to AAA access element 16. AAA access element 16 may then wait for the actual reply to this request and replicate it back to client-aware network elements 24a and 24b. When client-aware network elements 24a and 24b proxy this information back to AAA access element 16, the message may be acknowledged and then dropped. Particularly in the case for pre-existing client-aware network elements 24a and 24b, AAA access element 16 may be configured to identify whether or not to wait for the forwarded message from client-aware network elements 24a and 24b before proxying a message to either end user 12 or AAA server 18. This may be performed in certain scenarios in order to accommodate assumptions about timing that may already exist.

Other network equipment that seeks to monitor information from the communication flow may simply terminate the replicated radius (or other communication) protocol from AAA access element 16 in the same manner as a server would perform such a task. This may be particularly appropriate for equipment that is interested only in accounting messages or some other specific type of information and not all information within the communication flow. This configuration is simpler as the main flow is not impacted and only the state of the protocol between AAA access element 16 and client-aware network elements 24a and 24b are maintained.

In either case, whether the client-aware network elements 24a and 24b are pre-existing or newly introduced into communication system 10, AAA access element 16 enables filtering of communication flows such that a given client-aware network element may review only the messages that it is potentially interested in. Alternatively, AAA access element 16 may disseminate all information related to the communication flow to every piece of network equipment to which it is coupled. AAA access element 16 may also provide client-aware network elements 24a and 24b with access to the information derived from AAA flows across other interfaces, such as CORBA, XML, or any other suitable communications interface according to particular needs.

AAA server 18 is a server program that receives end user requests for access to networking resources. Networking resources refers to any device, component, or element that provides some functionality to end user 12 communicating in communication system 10. For a corresponding network, AAA server 18 may also provide authentication, authorization, and accounting services and management. Authorization generally refers to the process of giving an end user permission to do or to access something. In multi-user computer systems, a system administrator may define for the system which end users are allowed access to given locations in the system and, further, what privileges for an end user are provided. Once an end user has logged into a network, such as for example IP network 28a, the network may wish to identify what resources the end user is given during the communication session. Thus, authorization within communication system 10 may be seen as both a preliminary setting up of permissions by a system administrator and the actual checking or verification of the permission values that have been set up when end user 12 is attempting access to a selected area. Authentication generally refers to the process of determining whether an end user is in fact who or what it is declared to be. In the case of private or public computer networks, authentication may be done through the use of unique identification elements such as a user identity or log-on passwords. Knowledge of the password offers a presumption that the end user is authentic. Accounting generally refers to financial or session information associated with each end user or each network and may additionally include trafficking information, session timing information, data transfer statistics, or information relating to other information flows within communication system 10.

AAA server 18 may receive the IP address and other parameters from any suitable source, such as client-aware network elements 24a and 24b, or alternatively from a dynamic host configuration protocol (DHCP) server or a domain name system (DNS) database element, in order to direct data to be communicated to end user 12. AAA server 18 may include any suitable hardware, software, components, or elements that operate to receive data associated with end user 12 and provide corresponding AAA-related functions to network components within communication system 10. Authorization and IP address management may be retrieved by AAA server 18 from a layer two tunneling protocol network server (LNS), which may be provided to address secure services for end user 12 where appropriate.

In an alternative embodiment of the present invention, communication system 10 may be implemented with an accounting server (used to supplant AAA server 18) or with any other passive (or incidental) server or element that replaces AAA server 18 and operates as another client-aware network element. Additionally, communication system 10 may be configured without AAA server 18 in accordance with the teachings of the present invention. In such an arrangement, AAA access element 16 may be configured to ignore AAA results and to properly forward information to selected client-aware network elements 24a or 24b. Responses from each of client-aware network elements 24a and 24b may be treated as ACK signals back to NAS 14. Other suitable intra-communications between various elements within communication system 10 in the absence of AAA server 18 may be made where appropriate and according to particular needs.

Client aware network elements 24a and 24b are each network components that seek to receive or otherwise access a portion of information contained within a communication flow between NAS 14 (or end user 12) and AAA server 18. Client aware network elements 24a and 24b may be any device or component within communication system 10 that seek to receive data relating to the communication flow initiated by end user 12. In a particular embodiment, client-aware network elements 24a and 24b are client-aware components that provide or offer some service or feature to end user 12. For example, client-aware network elements 24a and 24b may wish to glean any information about the communication flow, such as that a particular end user exists, that they have certain attributes or qualities, and that they have done or performed some task in the network previously. Client aware network elements 24a and 24b may also wish to identify end user 12 for authorization purposes or to maintain a profile of end user 12 to provide for accounting records or content billing information. Alternatively, client-aware network elements 24a and 24b may use the information within the communication flow to provide for any other type of suitable client-aware service, tool, or feature according to particular needs of network components, equipment, or the particular end user 12. Additional services may be related to areas such as routing, accounting, firewalling, filtering, or any other suitable parameters or policies where user-aware characteristics serve as a basis for service or enhancement implementation. Each client-aware network element 24a and 24b may be capable of independent operation such that the failure or disablement of one does not necessarily affect the functionality of another or of communication system 10.

In an alternative embodiment of the present invention, client-aware network elements 24a or 24b may be provided within an IP gateway. In such an embodiment, client-aware network elements 24a or 24b may behave in the same manner as described above in receiving information gleaned from the communication flow in order to track, monitor, or otherwise use the data received from AAA access element 16. Client aware network elements 24a and 24b may then use this data from the communication flow in order to provide user-specific elements to end user 12. For example, client-aware network elements 24a and 24b may use the information to discern an income bracket for a group of end users and provide an automobile web site targeted for that group of end users who can afford cars offered on the web site.

In a particular embodiment where a radius communications protocol is being used in conjunction with client-aware network elements 24a and 24b, the nature of radius communication allows client-aware network elements 24a and 24b to selectively receive specific information about the communication flow. This is because radius has separate accounting flows and access flows, which allow for a selective dissemination of data to client-aware network elements 24a and 24b. For example, in certain scenarios, client-aware network elements 24a and 24b may be interested in only receiving a user-name, a phone number, or a password. Additionally, other client-aware network elements 24a or 24b may not be interested in receiving certain information and thus may be excluded from those particular communication flows.

Each client-aware network element 24a and 24b may include a table (transient or otherwise) for storing information such as the hardware end user 12 is currently using, the service provider offering service to end user 12, network characteristics such as information related to gateway general packet radio service support node (GGSN) or packet data serving node (PDSN) characteristics, or any other suitable user profile characteristic or parameter that may be gleaned from sniffing the communication flow. Client aware network elements 24a and 24b may also perform a layer two to layer three mapping. Client aware network elements 24a and 24b may identify and further authenticate end user 12 and then permit end user 12 access to a selected network. For example, client-aware network elements 24a and 24b may allow access to IP network 28a and possibly not permit access to IP network 28b. Client aware network elements 24a and 24b may also perform layer three to layer seven (or higher) mapping.

In addition, each client-aware network element 24a and 24b may be suitably configured in order to cooperate with ANDing and ORing elements or architectures according to particular needs. In such an arrangement, the results of each client-aware network element 24a and 24b may be communicated to NAS 14 for additional processing, whereby NAS 14 awaits an ACK signal before offering access to a network for a client or an end user.

IP networks 28a and 28b each represent a series of points or nodes of interconnected communication paths for receiving and transmitting packets of information that propagate through communication system 10. IP networks 28a and 28b may be coupled to one or more client-aware network elements 24a or 24b. IP networks 28a and 28b may offer a communications interface between client-aware network elements 24a and 24b and WAP gateway 32. IP networks 28a and 28b may be any local area network (LAN), metropolitan area network (MAN), or wide area network (WAN) or any other appropriate architecture or system that facilitates communications in a network environment. IP networks 28a and 28b implement a TCP/IP communications language architecture in a particular embodiment of the present invention. However, IP networks 28a and 28b may alternatively implement any other suitable communication protocol for transmitting and receiving data packets within communication system 10.

WAP gateway 32 is a network point or node that operates as a data exchange interface-between IP network 28b and another node in the network. Alternatively, WAP gateway 32 may be any server, router, gateway, or element operable to facilitate network communications. WAP, as referred to herein in this document, generally represents a specification for a set of communication protocols to standardize the way that wireless devices, such as for example cellular/wireless telephones and radio transceivers, can be used for Internet access including e-mail, the world wide web, newsgroups, and internet relay chat systems.

WAP gateway 32 may allow a device or component, such as for example end user 12, to initiate a request from IP network 28b and may then generally facilitate the delivery of the requested data back to a source or to end user 12. Such data may be translated into a WAP format or any other suitable format, such that the source of the requested data may be able to interpret the information properly or such that the requested data may be adequately displayed on a suitable device or component.

Figure 2:
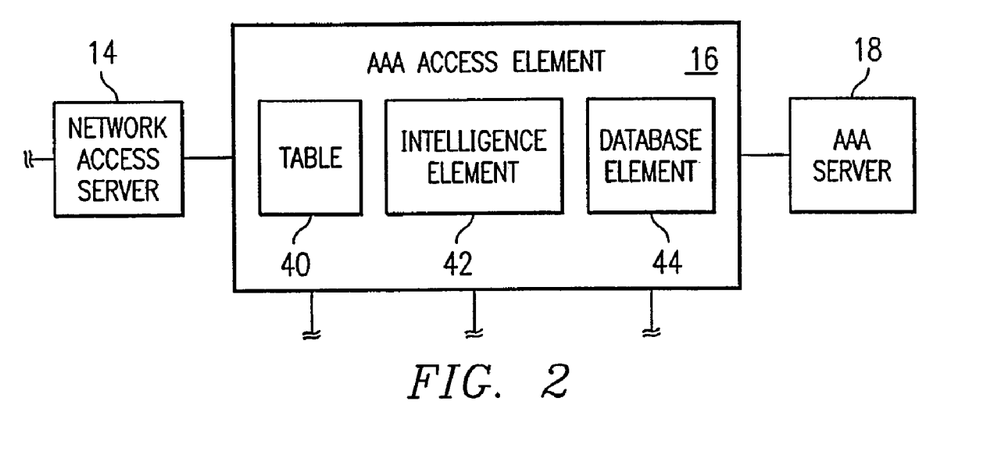
FIG. 2 is a simplified block diagram of an authentication, authorization, and accounting (AAA) access element for monitoring data.

FIG. 2 is a simplified block diagram illustrating additional details relating to AAA access element 16. In a particular embodiment of the present invention, AAA access element 16 includes a table 40, an intelligence element 42, and a database element 44. These elements provided in AAA access element 16 are offered as enhancements to AAA access element 16 and should not be construed to limit or to constrain the teachings of the present invention.

Table 40 is a data storage unit that tracks, maintains, or identifies the types of information that each of client-aware network elements 24a and 24b desire to know. In addition, table 40 may also keep track of when this information needs to be provided to one or more client-aware network elements 24a and 24b. Table 40 may be configured such that it shares information with network vendors or other equipment within the network and not share such information to others. Table 40 may also be used in order to build information and hold it persistently, potentially as long as end user 12 is active in communication system 10. Alternatively, table 40 may temporarily store information about the communication flow involving end user 12 for the duration of the communication session or communication flow.

Intelligence element 42 includes information that designates one or more backup client-aware network elements for one or more client-aware network elements 24a and 24b respectively. In scenarios in which client-aware network elements 24a and 24b become inoperational or otherwise malfunction (temporary or permanent), intelligence element 42 may direct AAA access element 16 to provide specified data to a backup client-aware network element such that the dissemination of information relating to the communication flow is uninterrupted. Intelligence element 42 may also include an overall mapping of all network devices or components within communication system 10.

Database element 44 is a storage element that maintains information relating to end user 12 in a persistent or temporary fashion. The information that is persistently stored in database element 44 provides storage for data that may be used by client-aware network elements 24a and 24b if they are temporarily rendered inoperational or otherwise need to reload a portion of data relating to the communication flow. When recovering from a temporary block of inoperation, client-aware network elements 24a and 24b may query database element 44 after operation has resumed and retrieve any required information in order to continue in the process of gleaning information about communication flows between AAA server 18 and end user 12. Database element 44 may also store redundant information about communication flows within communication system 10.

Table 40, intelligence element 42, and database element 44 may be populated using any number of suitable approaches or techniques. Entries within table 40, intelligence element 42, and database element 44 may be cleaned up, deleted, or updated periodically (or alternatively updated or changed based on some event or modification to system parameters) in order to accurately reflect current data relating to communication sessions within communication system 10. Entries could also be deleted specifically or deleted per communication flow. In the case of radius messaging, the population of the table may be controlled by radius accounting messages or by any other suitable populating protocol according to particular needs.

Figure 3:
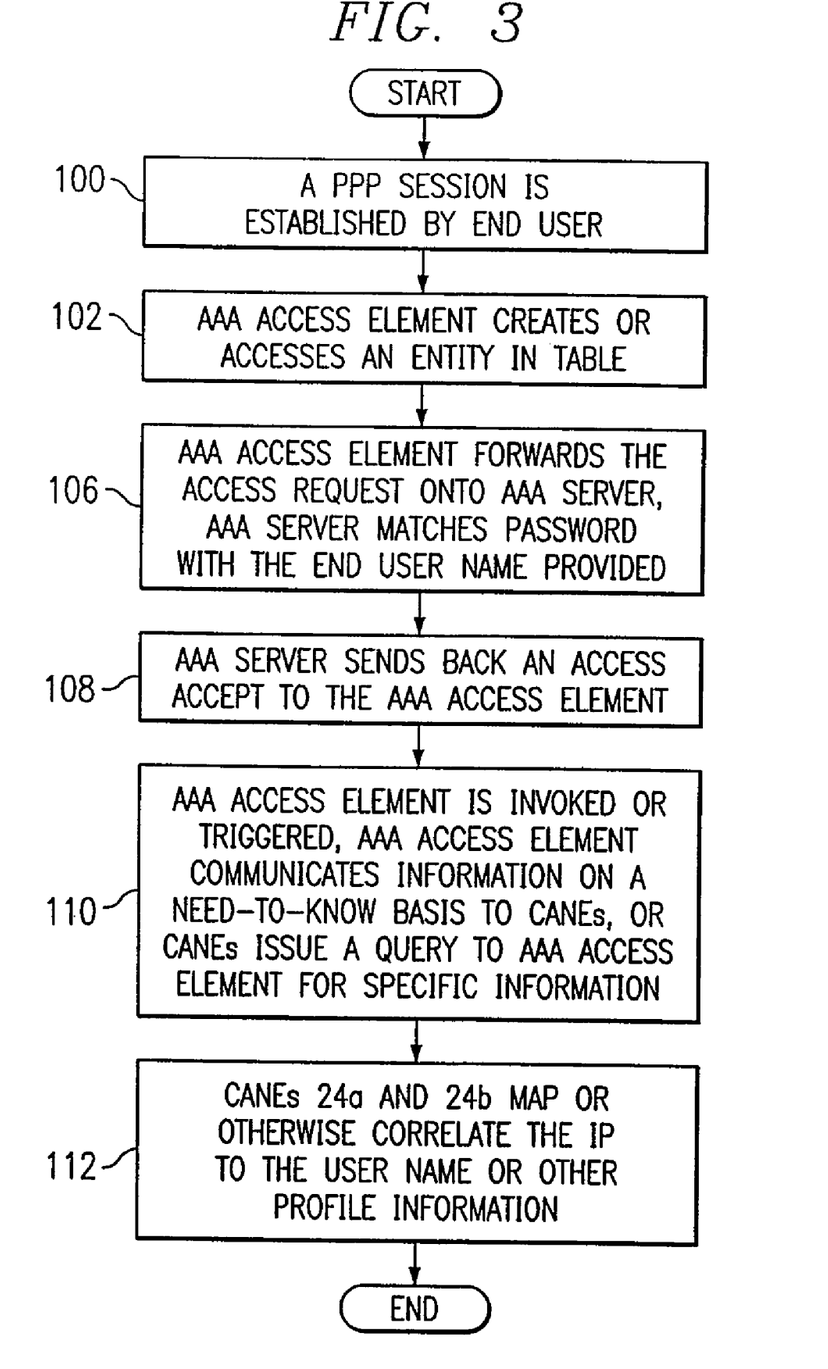
FIG. 3 is a flowchart illustrating a series of steps for monitoring data in a network environment.

FIG. 3 is a flowchart illustrating a series of steps associated with monitoring information in a network environment. The example illustrated in FIG. 3 is for client-aware network elements 24a and 24b that are aware of AAA access element 16. At step 100, a PPP session is established by end user 12. NAS 14 sends an access request through AAA access element 16 to AAA server 18. The access request may contain the user name, user IP address, or any other suitable parameters or elements where appropriate. A push or pull protocol may be implemented in generating the request to be sent to AAA server 18. At step 102, AAA access element 16 creates or accesses an entry in table 40, which may include the user name, the MSISDN, the IP address of NAS 14 that established the communication, or any other suitable parameter or piece of data.

At step 106, AAA access element 16 forwards the access request onto AAA server 18. AAA server 18 may then match a password with the user name provided. At step 108, AAA server 18 sends back an access accept to AAA access element 16. At step 110, AAA access element 16 may then be invoked or triggered. Accounting functions or other suitable applications may also be invoked. AAA access element 16 may communicate information on a need to know basis to client-aware network elements 24a and 24b or client-aware network elements 24a or 24b may issue a query to AAA access element 16 for specific information such as network ratings, user identity information, data related to filtering, level data, or any other suitable information sought by client-aware network elements 24a and 24b. At step 112, client-aware network elements 24a and 24b may then map or otherwise correlate the IP information or data to the user name or other profile information. The profile information may grant certain rights, privileges, or network enhancements to end user 12. For example, the profile information may dictate that end user 12 is provided access to IP network 28a or IP network 28b.

AAA access element 16 may now send accounting messages to client-aware network elements 24a and 24b, whereby client-aware network elements 24a and 24b may send back acknowledge messages. With the requisite knowledge now being communicated to client-aware network elements 24a and 24b for the communication session initiated by end user 12, each of client-aware network elements 24a and 24b is guaranteed that when the packet is communicated from NAS 14 it may propagate to the proper networks and be filtered appropriately according to the designated filtering rule set. Thus, client-aware network elements 24a and 24b have been primed to be ready for the communication session. Now when the communication traffic arrives, each of client-aware network elements 24a and 24b know how to properly process the incoming data. Accordingly client-aware network elements 24a and 24b are ready before the communication session is fully authorized.

Although the present invention has been described in detail with reference to particular embodiments, it should be understood that various other changes, substitutions, and alterations may be made hereto without departing from the spirit and scope of the present invention. For example, although the present invention has been described as operating in particular environments, the present invention may be used in any networking environment that seeks to glean information from within a communication flow. Communication system 10 may be used in conjunction with asynchronous transfer mode (ATM), frame relay, X.25, or any other type of packet or circuit-switched network.

Additionally, although the present invention has been described with reference to communications between end user 12 and AAA server 18, AAA access element 16 as described herein may be implemented for communications between any two components within or external to a network. The present invention has merely described an example network environment for teaching purposes. This should not be construed to limit how or where AAA access element 16 is implemented. Moreover, the proxying and monitoring configurations disclosed above may be implemented in conjunction with any component, unit, hardware, software, object, or element involved in the communications process. It should be clear from the foregoing that AAA access element 16 may be used outside the field of AAA, where the proxying or monitoring of data is an element of the communications architecture that is implemented. AAA access element 16 may be used in any environment where multiple devices desire to glean information from a communication flow.

Furthermore, AAA access element 16 may be included in AAA server 18 or in one of client-aware network elements 24a and 24b, or in any other element or component within communication system 10. AAA access element 16 has been illustrated in FIGS. 1 and 2 in a designated position for purposes of teaching the present invention, but AAA access element 16 may be positioned anywhere in the network and included in any additional network equipment or device where appropriate.

In addition, although the example illustrated in FIG. 3 is provided for client-aware network elements 24a and 24b that are aware of AAA access element 16, AAA access element 16 may be used in legacy system architectures without departing from the teachings of the present invention. Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. The present invention is not intended to be limited in any way by any statement in the specification that is not otherwise reflected in the appended claims.

What is claimed is:

1. A method for enlisting one or more end users in a network environment in which information is being monitored, comprising:
enlisting one or more end users in a billing plan associated with network communications;
generating a bill associated with one or more of the end users, the bill being based on the billing plan; and
facilitating network communications for one or more of the end users in response to the end users being enlisted in the billing plan, whereby the network communications includes a protocol that comprises:
an access element configured to receive one or more packets from a communication flow and to selectively communicate information associated with the communication flow to a plurality of client-aware network elements, wherein the information is authorization, authentication, and accounting (AAA) information that propagates between an end user and an AAA server, which is coupled to the access element, the AAA information being replicated and sent to the client-aware network elements, the access element including a table that identifies a selected one of the client-aware network elements to receive specific AAA data but not all incoming AAA data such that a filtering operation is achieved and only a portion of the incoming AAA data is sent to the selected client-aware network elements.

2. The method of claim 1, wherein the information associated with the communication flow is communicated to one or more of the client-aware network elements in response to a query from one or more of the client-aware network elements.

3. The method of claim 1, further comprising:
a network access server configured to establish the communication flow from an end user associated with the communication flow to the access element.

4. The method of claim 3, wherein the network access server performs internet protocol address management to the end user.

5. The method of claim 1, wherein the access element provides access to information derived from AAA flows across XML, Diameter, or Cobra interfaces.

6. The method of claim 1, wherein the access element comprises a database element configured to store portions of data from the communication flow, the portions being communicated intermittently to one or more of the client-aware network elements.

7. The method of claim 1, wherein the information associated with the communication flow is associated with communication service data, bandwidth parameters, or protocol information.

8. The method of claim 1, wherein one or more of the client-aware network elements use the information in order to provide client-specific capabilities to one or more end users associated with the communication flow.

9. The method of claim 1, wherein the access element comprises an intelligence element that instructs the access element to communicate the information associated with the communication flow to a backup client-aware network element in response to a corresponding one of the client-aware network elements being inoperative.

10. A method for enlisting one or more end users in a network environment in which information is being monitored, comprising:
enlisting one or more end users in a billing plan associated with network communications;
generating a bill associated with one or more of the end users, the bill being based on the billing plan; and
facilitating network communications for one or more of the end users in response to the end users being enlisted in the billing plan, whereby the network communications includes a protocol that comprises:
receiving one or more packets from a communication flow initiated by an end user; and
selectively communicating information associated with the communication flow to a plurality of client-aware network elements, wherein the information is authorization, authentication, and accounting (AAA) information that propagates between an end user and an AAA server, which is coupled to an access element, the AAA information being replicated and sent to the client-aware network elements, the access element including a table that identifies a selected one of the client-aware network elements to receive specific AAA data but not all incoming AAA data such that a filtering operation is achieved and only a portion of the incoming AAA data is sent to the selected client-aware network elements.

11. The method of claim 10, wherein the information associated with the communication flow is communicated to one or more of the client-aware network elements in response to a query from one or more of the client-aware network elements.

12. The method of claim 10, wherein the access element provides access to information derived from AAA flows across XML, Diameter, or Cobra interfaces.

13. The method of claim 12, further comprising:
performing internet protocol address management for the end user.

14. The method of claim 10, further comprising:
providing AAA functions to one or more end users associated with the communication flow.

15. The method of claim 10, further comprising:
storing portions of data from the communication flow, the portions being communicated intermittently to one or more of the client-aware network elements.

16. The method of claim 10, wherein the information associated with the communication flow is associated with communication service data, bandwidth parameters, or protocol information.

17. The method of claim 10, further comprising:
using the information in order to provide client-specific capabilities to the end user associated with the communication flow.

18. The method of claim 10, further comprising:
providing an instruction to communicate the information associated with the communication flow to a backup client-aware network element in response to a corresponding one of the client-aware network elements being inoperative.

19. The method of claim 10, further comprising:
maintaining, by the access element, state information about AAA flows.

20. The method of claim 10, further comprising:
broadcasting the information associated with the communication flow to all the client-aware network elements.

* * * * *